US006911150B2

(12) United States Patent
Churchman et al.

(10) Patent No.: US 6,911,150 B2
(45) Date of Patent: Jun. 28, 2005

(54) REUSE OF USED COOKING OIL ADSORBANTS

(75) Inventors: Gordon John Churchman, Firle (AU); Jennifer Susan Anderson, Greenwith (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 10/332,990

(22) PCT Filed: Jul. 26, 2001

(86) PCT No.: PCT/AU01/00915

§ 371 (c)(1),
(2), (4) Date: Sep. 25, 2003

(87) PCT Pub. No.: WO02/13962

PCT Pub. Date: Feb. 21, 2002

(65) Prior Publication Data

US 2004/0045905 A1 Mar. 11, 2004

(30) Foreign Application Priority Data

Jul. 27, 2000 (AU) .............................................. PQ9039

(51) Int. Cl.⁷ ............................................. B01D 11/00
(52) U.S. Cl. ..................................................... 210/633
(58) Field of Search ....................................... 210/633

(56) References Cited

U.S. PATENT DOCUMENTS

| 4,285,832 A | 8/1981 | Orth, Jr. ..................... 252/424 |
| 5,218,132 A | 6/1993 | Mobbs et al. ............... 554/191 |
| 5,725,805 A | 3/1998 | Kemnetz et al. ............ 252/315 |

OTHER PUBLICATIONS

Derwent Abstract Accession No. 86–045880/07, JP 61–000284A (Amachi), Jan. 6, 1986.
Derwent Abstract Accession No. 78–18732A/10, JP 53–009285A (Fukai), Jan. 27, 1978.
Derwent Abstract Accession No. 78–10949A/06, JP 52–152885A (Kansai Kogyo KK), Dec. 21,1977.

Primary Examiner—Chester T. Barry
(74) Attorney, Agent, or Firm—Jacobson Holman PLLC

(57) ABSTRACT

A method for treatment of organic-based material comprising contacting the organic-based material with solid waste material from the treatment of cooking oils. The treatment may comprise a clean-up of said organic-based materials, particularly clean up of an oil spill on a body of water. The solid waste material may be applied directly to the oil or it may be placed in bags prior to placing it on an oil spill. The solid waste material from the treatment of cooking oils is the solid waste product used in the treatment of cooking oils and cooking fats for the purpose of removing undesirable compounds that affect flavor, color and odor therefrom. The solid waste material from the treatment of cooking oils typically comprise particulate material, such as acid-activated clays, that are loaded with adsorbed compounds and contain residual oils from the treatment process.

14 Claims, 5 Drawing Sheets

REUSE OF USED COOKING OIL ADSORBANTS

This is a nationalization of PCT/AU01/00915 filed Jul. 26, 2001 and published in English.

The present invention relates to a method for the retardation, containment and/or removal of liquid hydrocarbons. The method more particularly relates to treating leakages of petroleum oil or other liquid hydrocarbons. The method is particularly suitable for ameliorating oil spills, for removing unwanted oil and for forming barriers around leaking underground petroleum plumes.

BACKGROUND OF THE INVENTION

Cooking oils and cooking fats are food grade products typically obtained from plant or animal origin. Cooking oils include sunflower oil, peanut oil, canola oil, safflower oil and olive oil. Vegetable oils may also be treated to obtain margarine. Cooking fats, such as tallow and lard, typically come from animal origins.

The raw oils and fats normally contain a number of compounds that render those products unpleasant or unpalatable. These compounds include compounds that result in undesirable taste, colour and odour. In order to improve the commercial acceptability of such products, the cooking oils and cooking fats are normally treated to remove those undesirable compounds.

The normal method of treatment involves contacting the cooking oils and cooking fats with a clay-based adsorbent material. The adsorbent material is often an acid-activated clay that adsorbs the undesirable compounds from the cooking oil or cooking fats. The fats may be thus-treated at elevated temperature to place the fats into the liquid state.

Once the adsorbent material has adsorbed its capacity of undesirable compounds, it is loaded with such compounds and cannot adsorb any more. At this stage, the loaded adsorbent is removed from the adsorbing apparatus and replaced with fresh adsorbent.

The waste adsorbent recovered from the treatment of cooking oils and cooking fats is loaded with adsorbed compounds. Consequently, it has effectively no remaining capacity for adsorption. Furthermore, the waste adsorbent contains residual amounts of oils or fats therein, despite the waste adsorbent being treated to remove as much oil or fat as possible therefrom. As a result, further use or disposal of the waste adsorbent is problematical.

BRIEF DESCRIPTION OF THE INVENTION

The present inventors have now surprisingly discovered that the waste adsorbent from treating cooking oils and cooking fats can be used to treat oil spills and to contain spills of oil and other hydrocarbon products and otherwise be used in clean up of organic-based wastes.

In order to clearly explain nomenclature, throughout this specification the term "solid waste material from the treatment of cooking oils and fats" will refer to the solid waste product used in the treatment of cooking oils and cooking fats for the purpose of removing undesirable compounds that affect flavour, colour and odour therefrom and typically comprise particulate material, such as acid-activated clays, that are loaded with adsorbed compounds and contain residual oils from the treatment process.

In a first aspect, the present invention provides a method for the retardation, containment and/or removal of liquid hydrocarbons comprising contacting the liquid hydrocarbons with solid waste material from the treatment of cooking oils and fats.

The treatment preferably comprises a clean-up of said liquid hydrocarbons.

In one embodiment, the method of the present invention involves at least partly clearing spills of liquid hydrocarbons, such as petroleum oil on a body of water, by contacting said liquid hydrocarbons with solid waste material from the treatment of cooking oils.

The solid waste material may be applied to the surface of the liquid hydrocarbons on water. However, it has been found in laboratory scale tests that agitation of the water to simulate the action of waves can cause the solid waste material to sink. In order to address this, it is preferred that the solid waste material is contained within a bag composed of an outer fabric or netting which has permeability to the liquid hydrocarbons. If the bag is made from a woven or sewn material, the bag should have openings sufficiently small so as to substantially contain the solid waste material material. The bag is suitably made from a fabric or netting. The bag containing the solid waste material is placed within or nearby the film of liquid hydrocarbons on the water. In tests in which the water and liquid hydrocarbons are agitated to simulate wave action, it was found that liquid hydrocarbons are taken up into the bag during agitation. It was also found that the bag containing solid waste materials did not sink in the water.

Various drying treatments have been found to assist the removal of some types of liquid hydrocarbons. However, the inventors have found that improved removal of liquid hydrocarbons may occur in some cases if the solid waste material is not dried prior to use but rather used in an as-received condition.

In another embodiment, the solid waste material is used as a barrier for the retardation, containment and/or retention of hydrocarbons from transport or storage facilities for the hydrocarbons or in underground plumes of hydrocarbons, such as petroleum oils. In this case the barrier is constituted when the solid waste material from the treatment of cooking oils positioned relative to a source of hydrocarbons such that spillage of hydrocarbons from the source of hydrocarbons comes into contact with the solid waste material. In particular, the solid waste material may be positioned as a barrier around oil pipelines (both above-ground pipelines, in which the solid waste material is laid under the pipeline, and in-ground pipelines in which the solid waste material is preferably positioned to surround the pipeline), under and around petroleum storage tanks and the like.

In another embodiment of the present invention, the solid waste material is used as a sorbent for hydrocarbons and other non-ionic organic pollutants from water.

EXAMPLES

In order to illustrate the present invention, preferred embodiments of the present invention will be described hereunder with reference to the following Examples:

Example 1

Figure 1:
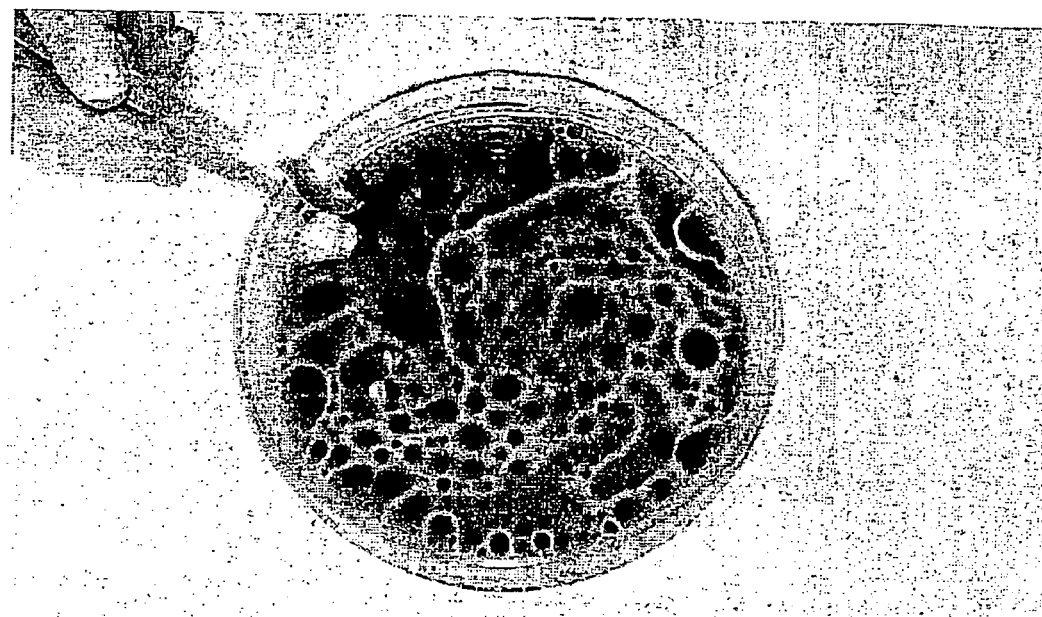
FIG. 1 is a photograph showing a top plan view of a crude oil film on sea water in a petri dish and a spatula of solid waste material is being added to the oil film at time 0.
Figure 2:
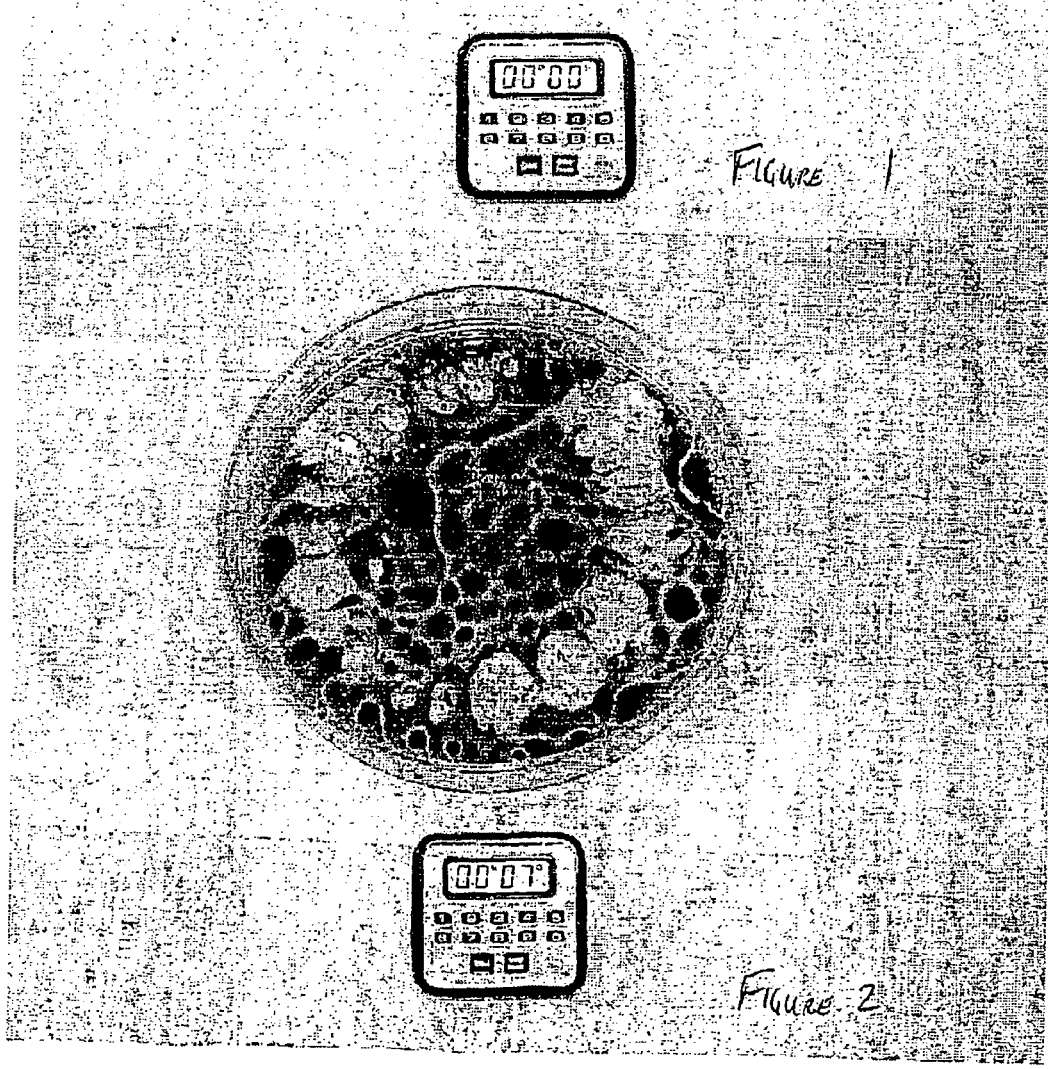
FIG. 2 is a photograph showing a top plan view of the crude oil film on sea water and the added solid waste in a petri dish 7 seconds after time 0.
Figures 3, 4:
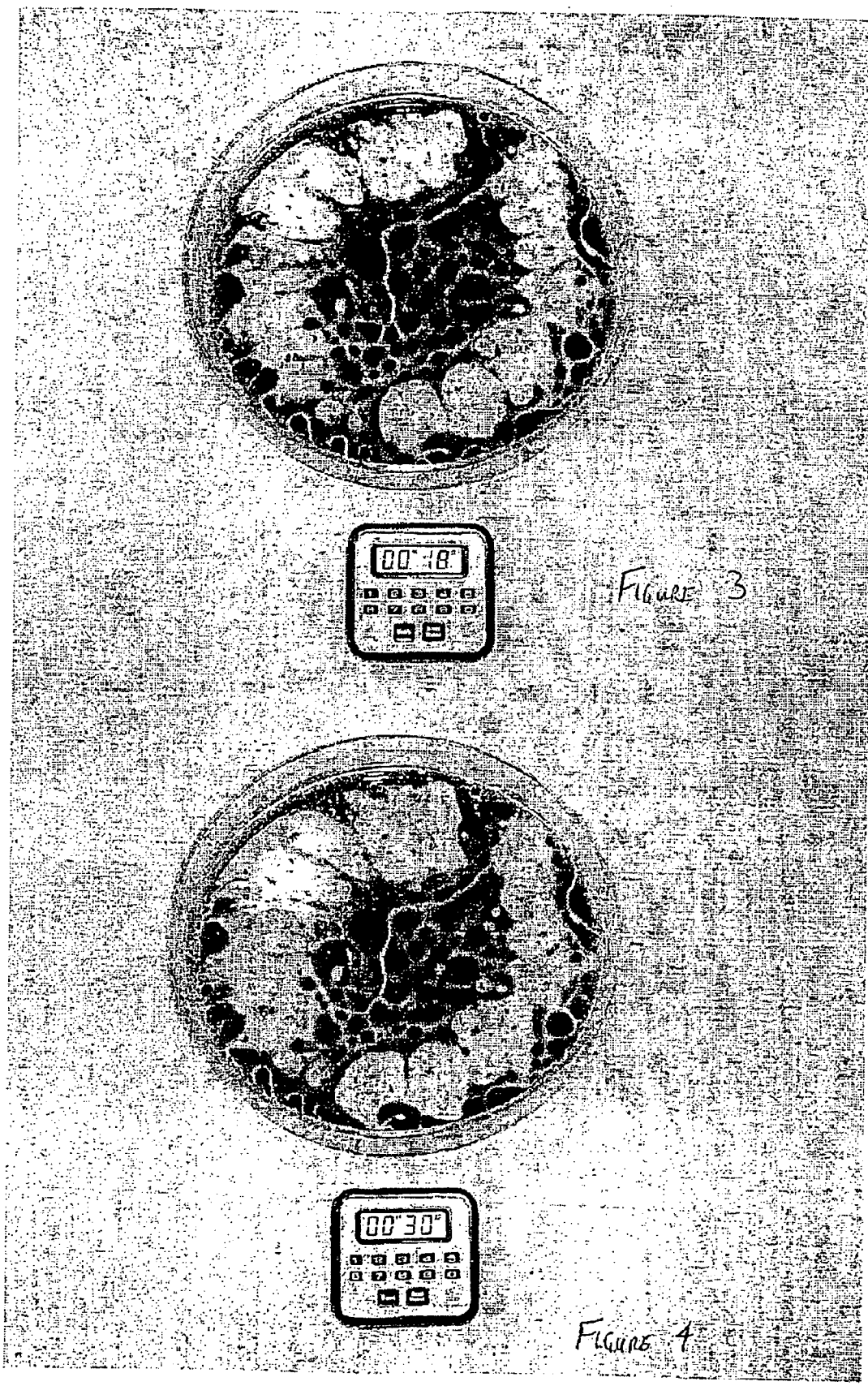
FIG. 3 is a photograph showing a top plan view of the crude oil film on sea water and the added solid waste in a petri dish 18 seconds after time 0.
FIG. 4 is a photograph showing a top plan view of the crude oil film on sea water and the added solid waste in a petri dish 30 seconds after time 0.
Figures 5, 6:
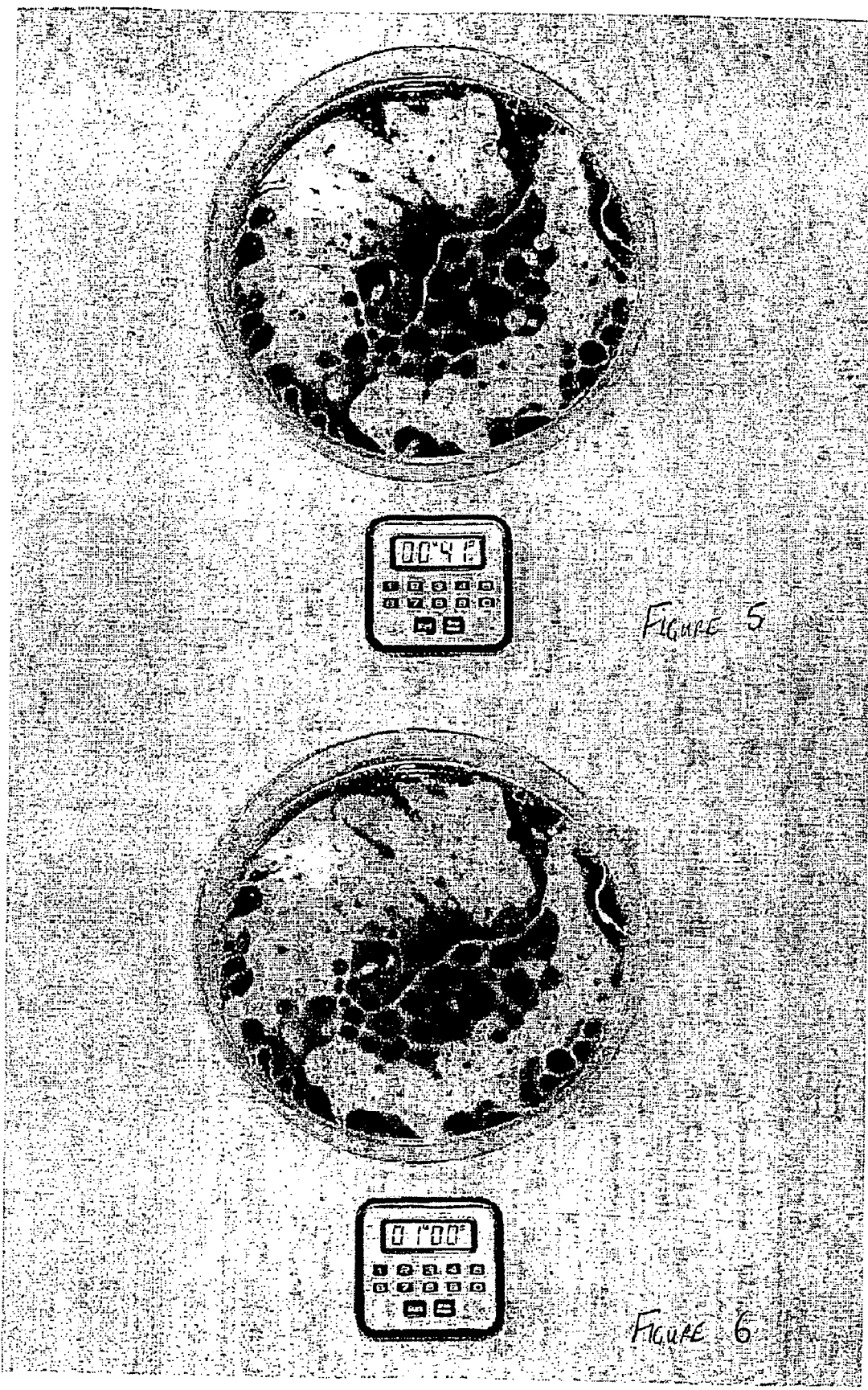
FIG. 5 is a photograph showing a top plan view of the crude oil film on sea water and the added solid waste in a petri dish 41 seconds after time 0.
FIG. 6 is a photograph showing a top plan view of the crude oil film on sea water and the added solid waste in a petri dish 1 minute after time 0.
Figures 7, 8:
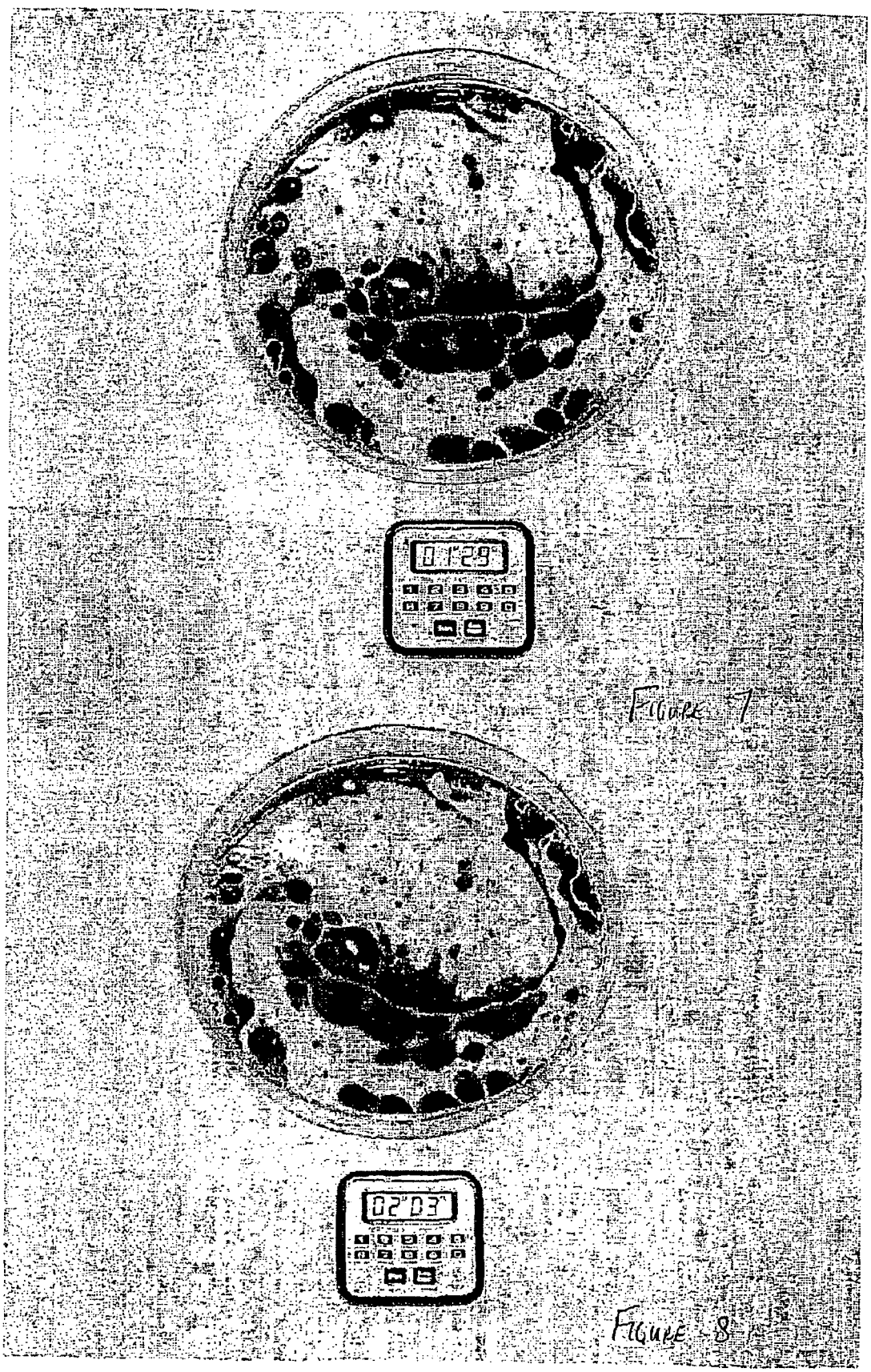
FIG. 7 is a photograph showing a top plan view of the crude oil film on sea water and the added solid waste in a petri dish 1 minute and 29 seconds after time 0.
FIG. 8 is a photograph showing a top plan view of the crude oil film on sea water and the added solid waste in a petri dish 2 minutes and 3 seconds after time 0.

Clearance of oil spills—A complete film of Arab extra light whole crude oil from the Port Stanvac Oil Refinery of Mobil Oil Company was created by dropping the oil onto sea water (from the Gulf of St Vincent of South Australia) in a petri dish. At time 0 (see FIG. 1), approximately one sixth of a spatula of solid waste material from the processing of tallow by Meadow-Lea Limited in Sydney was dropped in small fragments onto the surface of the oil film in a circular clock-wise fashion. The solid waste product had first been dried overnight in an oven at 105° Celsius. As shown in FIG. 2, which is a photograph taken seven seconds after the solid waste material had been added to the oil film, repulsion of the crude oil occurred wherever the waste material fell, to give rapid clearing of the oil film at those points. Clearing of the oil film continued steadily after the solid waste material was deposited, so that the photos shown in FIG. 3 (taken 18 seconds after addition of the solid waste material), FIG. 4 (taken 30 seconds after addition of the solid waste material), FIG. 5 (taken 41 seconds after addition of the solid waste material), FIG. 6 (taken one minute after addition of the solid waste material) and FIG. 7 (taken one minute 29 seconds after addition of the solid waste material) each showed an increased area of clear surface, with oil being confined to smaller volumes. FIG. 8, which is photograph taken after two minutes, three seconds from addition of the solid waste material, showed only a little change compared with the photograph of FIG. 7, which was taken 32 second earlier. However, it was noted that quite considerable changes continued to occur beyond this time, with the oil largely being cleared from the circumference of the dish. The final result was a set of discrete "islands" of oil separated by a cleared water surface. Other tests were carried out in jars to show that the waste material could clear different amounts (thicknesses) of oil in the film.

Without wishing to be bound by theory, it has been postulated that when the solid waste material comes into contact with the oil spill, some of the compounds adsorbed onto the solid waste material come out of the waste material and seem to repel the crude oil. Eventually, after the bulk of the compounds adsorbed on the solid waste material have been removed therefrom, the solid waste material starts to adsorb the oil. Therefore, there appears to be two phases in the treatment process—a repulsion effect in which desorption of the compounds from the solid waste material repel the oil away from the solid waste material and an attraction effect in which the oil is adsorbed by the waste material.

It is also postulated that the solid waste material has to carry some sort of compound that causes the solid waste material to be hydrophobic such that it tends to float on the water, rather than sinking into the water. It will be appreciated that films of oil float on water and thus it is necessary for the solid waste material to also remain at least at the level of the oil-water interface in order to properly treat the oil spill. It is believed that one or more of the compounds adsorbed from the cooking oil on the solid waste material provides a suitable hydrophobic material. It will also be understood that the solid waste material is typically a clay which has been acid activated. Such clays are normally hydrophilic in their natural state.

In the tests conducted by the present inventors, it was found that a crusty material containing adsorbed oil remained on the surface of the water following treatment of the oil spill. This material could be easily scooped from the surface of the water It has also been found that agitation may result in the powdered material sinking into the water. However, sinking was avoided if the solid waste material was placed in a bag prior to placing it onto the water. The bag is preferably made from netting or fabric. In tests involving solid waste material contained within a bag, the solid waste material removed oil from the surface of the water and the bag of fabric or netting containing the solid material did not sink following agitation. Therefore the embodiment that involves containment of the material in a bag is preferred.

Figure 9:
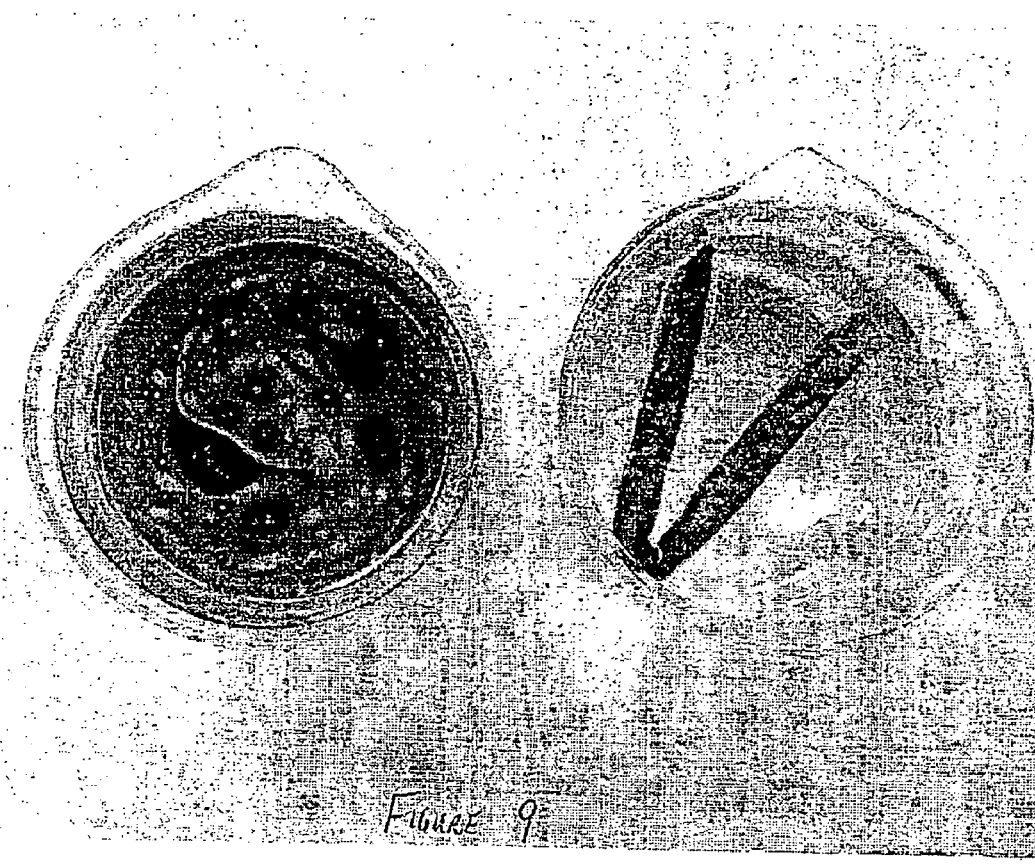
FIG. 9 is a photograph showing the comparison of the result of the test according to the present invention with container on the left containing the crude oil and sea water before processed by the method of the present invention and the container on the right containing the substances after processed by the method of the present invention.

A test was conducted following a scaled-down version of a test based on the ASTM F726-99 Standard Method of Testing—Sorbent Performance of Adsorbents as described in the EC 1999-2000 Sorbent Test Program of the Environment Technology Centre, Environment Canada 1997. A tubular-shaped bag approximately 1 centimetre in thickness and 20 centimetres long was made of a porous material by stitching its sides together with cotton thread. 2 grams of solid waste material from the processing of tallow by Meadow-Lea Limited in Sydney was added into the bag to give a relatively even spread and the bag was closed with thread. The bag was dropped into sea water (from the Gulf of St Vincent of South Australia) contained in a stoppered glass bottle. This was gently shaken in the water on a side-to-side shaker table for 15 min. The water was then poured off and replaced by fresh sea water. 20 drops of Arab extra light crude oil from the Port Stanvac Oil Refinery of Mobil Oil Company was dropped from a Pasteur pipette onto the sea water which held the bag containing the solid waste material. The bottle was then shaken in the same manner as before for a further 15 minutes. It was found that the oil was taken up into the bag as a result of the shaking action. The surface of the water was cleared of oil. The photograph on the right in FIG. 9 shows the result of the test after the contents of the stoppered bottle was poured into a clean glass beaker. This is compared in FIG. 9 with the photograph on the left showing the effect of dropping 20 drops of the crude oil onto seawater and hence indicates the starting point of the uptake of oil by the wetted soild waste materials in the porous bag.

It was found that the gathered oil was contained in the bag containing the solid materials provided the openings in the bag were sufficiently small. Otherwise, oil was attracted towards the bag, but some, at least, was found to have coated the outside surface of the bag.

Current techniques for treating oil spills utilise synthetic clays that have been contacted with quaternary ammonium compounds in order to soak up the oil. Tests conducted by the present inventor have indicated that the solid waste material works much more quickly than the synthetic clay that has been contacted with quaternary ammonium compounds.

Example 2

Uptake of aromatic hydrocarbons from solution—when 100 mgs of the wastes specified below were shaken with solutions containing 250 mgs per kilogram of toluene in water, the following percentage removal of toluene into the solid waste material phase was observed:
a) Solid waste material from decolourising tallow, dried at 105° Celsius—73.8% removal.
b) Solid waste material from decolourising tallow, washed with water—73.6% removal.
c) Solid waste material from decolourising sunflower oil, heated at 105° Celsius—61.2% removal.
d) Solid waste material from decolourising sunflower oil, washed with water—66.0% removal.

A comparison was made with the bentonite clay that was modified by reaction with a quaternary ammonium surfactant, dimethydioctadecylammonium bromide, to produce an organo-clay of the type that is considered to be very effective for the uptake of aromatic hydrocarbons (eg Lagaly, G. 1995, "Surface and Interlayer Reactions: Bentonites as Adsorbents", in: Churchman G J Fitzpatrick, R W, Eggleton, R A "EDS" Clays Controlling the Environment, CSIRO Publishing, Melbourne, Australia, page 137 to 144). The organo clay removed 76.7% toluene from the same solution. Hence, the solid waste materials used in the present invention are similarly effective as the synthetic organic clays as sorbents for aromatic hydrocarbons. Complete removal of hydrocarbons cannot be achieved directly by sorption as it occurs by partition of some of the hydrocarbon into the solid phase while the hydrocarbon maintains some solubility in (ie attraction for) water. However, the concentration of the hydrocarbons would become greatly attenuated as they flowed through a reactive barrier of sorbet material.

The present invention provides a method for removing oil from an environment whilst also utilising what would otherwise be a solid waste material. In embodiments in which the solid waste material is placed in bags, treatment of oil spills or leakages is easily achieved by placing the bags onto or close by the oil. In oil spills on the ocean, sea or other body of water, the bags could be connected together to act as a boom to surround the oil. The bags could alternatively be placed onto or into the oil to remove the oil from the water. The bags are easy to store, easy to handle and easy to place into their intended environment of use.

Those skilled in the art will appreciate that the invention described herein may be subject to variations and modifications other than those specifically described. It is to be understood that the present invention extends to encompass all such variations and modifications that fall within its spirit and scope.

What is claimed is:

1. A method for the retardation, containment and/or removal of liquid hydrocarbons, comprising contacting the liquid hydrocarbons with a solid waste material, said solid waste material comprising a particulate clay-based absorbent material derived from the treatment of cooking oils and fats for the purpose of removing undesirable compounds that affect flavor, color and odor of the cooking oils and fats.

2. The method as claimed in claim 1 wherein the liquid hydrocarbon has spilled onto a body of water and the method comprises contacting the liquid hydrocarbons with said solid waste material from the treatment of cooking oils.

3. The method as claimed in claim 2 wherein the solid waste material is applied to the surface of the liquid hydrocarbons.

4. The method as claimed in claim 3 wherein the solid waste material is applied as a fine powder to the surface of the liquid hydrocarbons.

5. The method as claimed in claim 3 wherein the solid waste material is contained within a bag composed of an outer fabric or netting which has permeability to the liquid hydrocarbons.

6. The method as claimed in claim 5 wherein the bag is made from a woven or sewn material and the bag has openings in its material sufficiently small so as to substantially contain the solid waste material.

7. The method as claimed in claim 6 wherein said bag containing said solid waste material is placed on or nearby said liquid hydrocarbons on said water and said liquid hydrocarbons are taken up into the bag and adsorbed by said solid waste material.

8. The method as claimed in claim 1 wherein the solid waste material is not dried prior to use but rather used in an as-received condition.

9. The method as claimed in claim 1 wherein the solid waste material is dried prior to use.

10. The method as claimed in claim 1 wherein the solid waste material comprises a barrier for the retardation, containment and/or retention of hydrocarbons in underground plumes of hydrocarbons or from transport or storage facilities for the hydrocarbons.

11. The method as claimed in claim 10 wherein the solid waste material is positioned as a barrier around oil pipelines or under and around petroleum storage tanks.

12. The method as claimed in claim 11 wherein the solid waste material is laid under an above-ground pipeline.

13. The method as claimed in claim 11 in which the solid waste material is positioned to surround an underground pipeline.

14. The method as claimed in claim 1 wherein the solid waste material is used as a sorbent for hydrocarbons and other non-ionic organic pollutants from water.

* * * * *